Patented Jan. 21, 1930

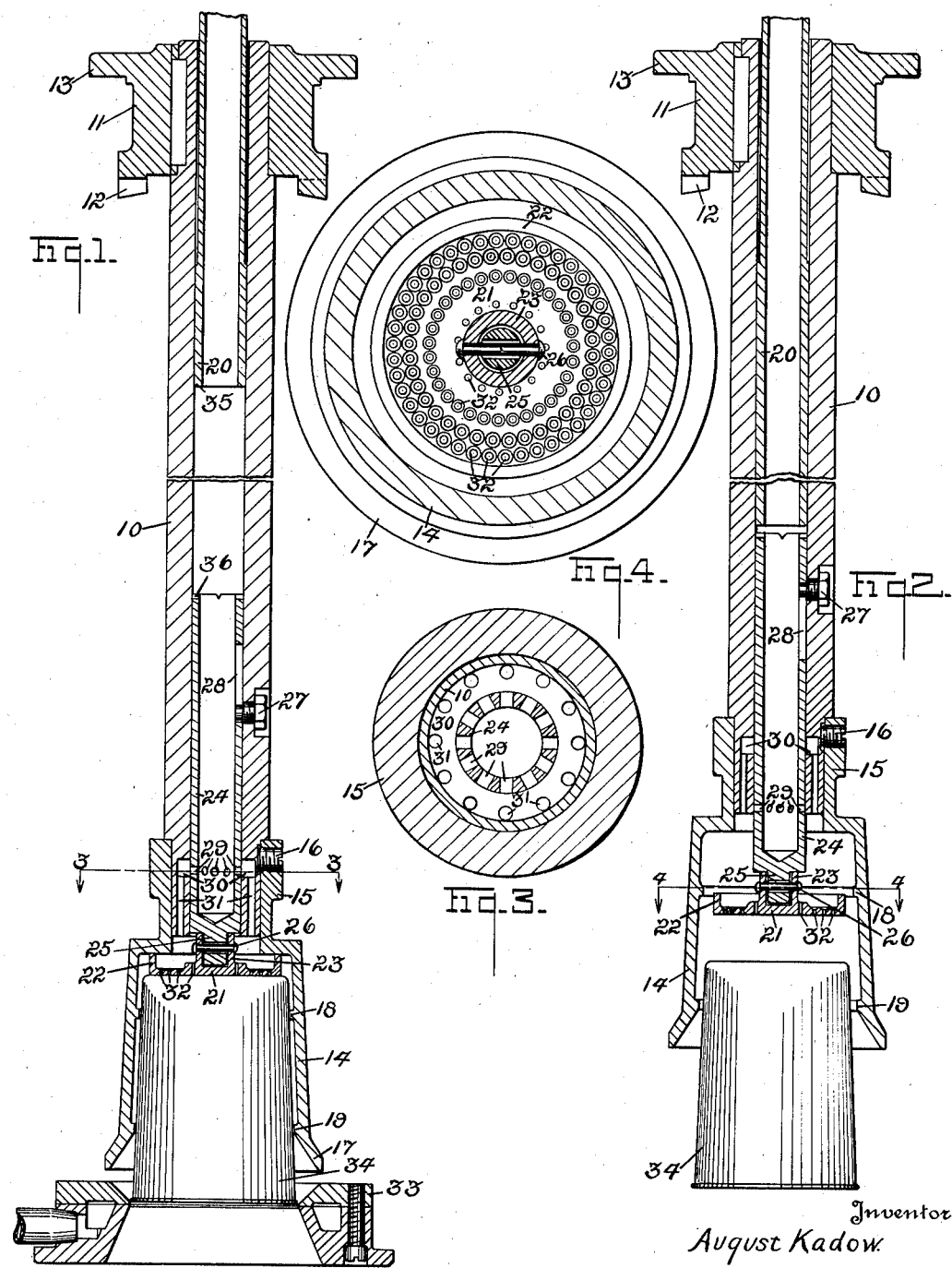

1,744,313

UNITED STATES PATENT OFFICE

AUGUST KADOW, OF TOLEDO, OHIO, ASSIGNOR TO THE LIBBEY GLASS MANUFACTURING COMPANY, A CORPORATION OF OHIO

VACUUM CHUCK

Application filed November 7, 1924. Serial No. 748,323.

My invention relates to a vacuum chuck and more particularly to a chuck adapted to handle such articles as hollow glassware. The object, nature and construction of my invention will appear as the description proceeds.

In the accompanying drawings, a construction is shown embodying my invention as used in a burning-off machine, such as disclosed in the co-pending application of Alvah C. Parker, Serial No. 744,135, filed Oct. 17, 1924.

Referring to the drawings, Figure 1 is a longitudinal section of a portion of the apparatus showing one embodiment of the invention; Fig. 2 is a section similar to Fig. 1 showing the parts in different relative positions; Fig. 3 is a section on the line 3—3 of Fig. 1; Fig. 4 is a section on the line 4—4 of Fig. 2.

In the construction shown, a spindle 10 is mounted to rotate about a vertical axis. A pinion 11 is keyed to the spindle and is rotated by suitable means (not shown) meshing with teeth 12. A flange 13 projecting from the upper end of pinion 11 rests upon a suitable support, not shown, and supports the pinion and spindle. A hollow chuck body 14 is suspended from the lower end of spindle 10 by means of a sleeve 15 projecting from the upper end of the body and secured to the spindle by a set screw 16.

The chuck body is shown with a flared lower end 17 and with centering rings 18, 19. A vacuum tube 20 projects into the upper end of the hollow spindle. A horizontal chuck plate 21 is positioned within the upper end of the chuck body and has a marginal upwardly projecting flange 22 adapted to fit against the annular surface at the upper end of the hollow within the chuck body. A socket 23 is provided on the upper side of plate 21. A tubular stem 24 extends down through the lower end of spindle 10 and has its reduced lower end 25 positioned within the socket 23 and fastened therein by a pin 26. A set screw 27 passes through the wall of the spindle into a longitudinal slot 28 in the wall of the tubular stem.

Perforations 29 are provided through the walls of the tubular stem. There is a channel 30 in the wall of the spindle around the tubular stem, and perforations 29 and channel 30 are so positioned that they will register when the flange 22 is in contact with the upper end of the chuck body. Holes 31 lead through the wall of the spindle from channel 30 to the hollow in the chuck body above plate 21. The horizontal portion of plate 21 has a plurality of perforations 32. A burner 33 is shown located beneath the chuck in proper position to burn-off a hollow glass article, such as a tumbler 34, mounted in the chuck.

One manner of using the apparatus is as follows:

Beginning with the parts in the position in which they are shown in Fig. 2, the treated article 34 is just dropping out of the chuck. After this article has been removed, another article is placed in substantially the position in which this article is shown, and thereafter the spindle is lowered to bring the chuck body around the article. The chuck plate and tubular stem drop downward with the spindle until the plate rests on the upper end of the article. Thereafter the spindle moves relatively to the stem and plate until flange 22 contacts the upper end of the chuck body. At this time perforations 29 register with channel 30 and thereby communication is established between the hollow in the chuck body above the plate and the vacuum pipe, and any air between the bottom of the article and the plate is evacuated through perforations 32, so that the article is held against the plate, and the article, plate and stem are held in the position in which they are shown in Fig. 1. While so held, the article is treated, as by burning-off the moil with a burner 33.

After the article is treated, the spindle is raised until the lower end 35 of vacuum tube 20 contacts the upper end 36 of stem 24. After such contact, continued elevation of the spindle results in forcing the stem, plate and article downward relatively to the chuck body. This results in cutting off communication through perforations 29, which are lowered out of register with channel 30, and also breaks the vacuum above the plate by separating flange 22 from the bottom of the chuck body. In this way the article is forcibly ejected from the chuck and at the same time the vacuum is broken, allowing the article to drop from the plate.

As will be readily seen, the same arrangement of parts may be manipulated in different ways. For example, the spindle might remain stationary and the plate and tubular stem might be raised into operative position by forcing the article upward into the chuck, and discharge might be by lowering the vacuum tube instead of by raising the spindle.

In any case, the chuck automatically retains an article therein, with no manipulation of the chuck except that incident to placing the article and chuck in proper relative positions, and the article is discharged by relative movement of the spindle and vacuum pipe.

It will be noted that the reduced end of tubular stem 24 fits loosely in socket 23 and about pin 26, so that the chuck plate may rock on the end of the stem any slight amount necessary. As the plate is in contact with the bottom of the article before the air above the plate is evacuated, the proper relation between the plate and bottom of the article is established even when the bottom of the article is not perfectly normal to the axis of the chuck. Openings 29, 30 and 31 are sufficiently large and numerous so that a sufficient degree of vacuum will be maintained above the plate even when the plate is tilted slightly with respect to the axis of the chuck, so that flange 22 does not fit perfectly against the chuck body.

Centering rings 18 and 19 maintain the axis of the article in exact alinement with the axis of the chuck regardless of any slight irregularity in the bottom of the article. These centering rings may be made integral with the chuck body, as shown, or permanently fixed in position, or may be given a limited vertical play where the articles do not run exactly uniform in diameter.

Various other changes in the shape and construction of the various parts, as well as in their operation, may be made within the scope of the appended claims without departing from the spirit of the invention.

What I claim is:

1. In a vacuum chuck, a hollow spindle, a vacuum pipe projecting into one end of the spindle, a perforated chuck plate adapted to fit against an article to be held by the chuck, a stem supporting the plate and projecting into and having limited reciprocation within the other end of the spindle, there being passageways connecting the rear of the plate with the vacuum pipe, said passageways being opened by movement of the stem to its inner position and closed by movement of the stem to its outer position, the vacuum pipe and stem being in alignment so that the stem may be driven outward from its inner position by relative movement of the spindle and pipe.

2. In a vacuum chuck, a hollow spindle, a perforated plate adapted to fit against an article to be held by the chuck, a tubular stem supporting the plate and having limited reciprocation within the spindle, the passage in the stem being closed at the end of the stem supporting the plate and open at its other end, and there being a lateral opening through the wall of the stem and a passageway in the wall of the spindle and opening at one end into the space immediately back of said plate and at the other end opening into the interior of the spindle, the last said opening being in position to register with said lateral opening when the stem is in its inner position.

3. In a vacuum chuck, a hollow spindle having a shoulder at one end, a plate adapted to fit against an article to be held by the chuck and having a flange adapted to fit against said shoulder, a stem supporting the plate and fitting within the end of the spindle, there being perforations through the plate between said flange and said stem, a passage in the wall of the spindle opening at one end through said shoulder and between said flange and stem and opening at its other end into the interior of the spindle and against said stem, and a passage in said stem opening at one end into the interior of the spindle at the inner end of the stem and opening through the wall of the stem in alignment with the passage in the wall of the spindle when the flange on the plate contacts the shoulder on the spindle.

4. In a vacuum chuck, a hollow spindle, a vacuum pipe projecting into one end of the spindle, a perforated chuck plate adapted to fit against an article to be held by the chuck, a tubular stem supporting the plate and having a limited reciprocation within the other end of the spindle, the passage in the stem being closed at its end supporting the plate and there being a lateral opening through the tubular wall of the stem and a passageway in the spindle wall leading from a space immediately back of said plate to the hollow within the spindle at a point which is in alignment with said lateral opening when the stem is in its inner position, the vacuum pipe and stem being in alignment so that the stem may be driven outward from its inner position by relative movement of the spindle and pipe.

5. In a vacuum chuck, a spindle, a hollow chuck body on the end of the spindle adapted to receive the end of an article to be held by the chuck, a chuck plate within the hollow body and adapted to be contacted by the inner end of an article in the chuck, a stem supporting the plate and projecting into the end of the spindle, there being passageways connecting the inner end of the hollow in said body with a vacuum pipe and said passageways being opened and closed by movement of the stem within the spindle.

6. In a vacuum chuck, a spindle, a hollow chuck body on the end of the spindle adapted to receive the end of an article to be held by the chuck, a chuck plate within the hollow chuck body and adapted to be contracted by the inner end of an article in the chuck, a stem supporting the plate and projecting into and having limited reciprocation within the end of the spindle, there being passageways connecting the inner end of the hollow in said body with a vacuum pipe and said passageways being opened by movement of the stem to its inner position and closed by movement of the stem to its outer position.

7. In a vacuum chuck, a hollow spindle having a shoulder at one end, a plate adapted to fit against an article to be held in the chuck and having a portion adapted to fit against said shoulder, a stem supporting the plate and reciprocable within the end of the spindle, a vacuum pipe projecting into the other end of the spindle, the parts being constructed to form a vacuum chamber back of the plate between the stem and the place where the plate contacts the shoulder, there being perforations through the plate into said chamber, a passageway from said chamber to the vacuum pipe opened by inward movement of the stem and closed by outward movement thereof, the vacuum pipe and stem being in alignment so that the stem may be driven outward from its inner position by relative movement of the spindle and vacuum pipe.

8. In a vacuum chuck, a hollow chuck body adapted to receive the end of an article, a perforated plate within the hollow of the body and reciprocable toward and from the wall thereof, there being a substantially closed space back of the plate when it is nearest said wall and passageways connecting said space to a vacuum pipe, said passageways being opened when the plate is moved towards the wall and closed when the plate is moved from the wall.

9. In a chuck, a member having a flat annular surface, a perforated plate having a flange adapted to bear against said surface, means supporting the plate for limited reciprocation to and from said surface, a vacuum pipe, members containing passageways connecting the space back of said plate with said pipe, and means connected with said plate support for opening said passageways when the plate is moved toward said surface and closing said passageways when the plate is moved away from said surface.

10. In a vacuum chuck, a member having a flat annular surface, means for centering an article coaxially with said surface and with its bottom towards said surface, a perforated plate having a flange adapted to bear against said surface, means supporting the plate for limited reciprocation to and from said surface and allowing limited movement of the plate to allow it to fit against the bottom of a centered article not precisely normal to said axis, and means for evacuating the air behind said plate.

11. In a vacuum chuck, a member having a flat annular surface, means for centering an article coaxially with said surface and with its bottom towards said surface, a perforated plate having a flange adapted to bear against said surface, means supporting the plate for limiting reciprocation to and from said surface and allowing limited movement of the plate to allow it to fit against the bottom of a centered article not precisely normal to said axis, a vacuum pipe, there being passages connecting the space back of the plate with the vacuum pipe, and means connected with said plate support for opening and closing said passageways.

12. In a vacuum chuck, a hollow chuck body adapted to receive the small end of a truncated conical article, centering rings within said body, a perforated plate within the body, a vacuum pipe, members having passageways connecting the space back of the plate with said pipe, and a stem connected by a loose joint to said plate and acting as a valve controlling said passageways.

In testimony whereof, I have hereunto signed my name to this specification.

AUGUST KADOW.